United States Patent [19]

Izzi

[11] Patent Number: 4,696,329

[45] Date of Patent: Sep. 29, 1987

[54] FEEDBACK CONTROL FOR AUTOMATIC FILLING MACHINE

[75] Inventor: Anthony J. Izzi, Malvern, Pa.

[73] Assignee: Mateer Burt Co., Inc., Wayne, Pa.

[21] Appl. No.: 872,367

[22] Filed: Jun. 9, 1986

[51] Int. Cl.⁴ .............................................. B65B 1/12
[52] U.S. Cl. ......................................... 141/1; 141/83; 141/94; 177/50
[58] Field of Search ...................... 141/1, 83, 129, 100, 141/196, 94–96; 198/504; 222/14, 643, 52, 54, 55; 221/1; 73/3; 177/52, 103, DIG. 7, 50; 364/479, 564, 567; 307/308

[56] References Cited

U.S. PATENT DOCUMENTS

| | | | |
|---|---|---|---|
| Re. 23,888 | 10/1954 | Mateer | 222/70 |
| Re. 24,079 | 10/1955 | Mateer | 222/378 |
| 4,582,097 | 4/1986 | Izzi et al. | 141/1 |
| 4,621,664 | 11/1986 | Pryor et al. | 141/83 |

*Primary Examiner*—Houston S. Bell, Jr.

*Attorney, Agent, or Firm*—Seidel, Gonda, Goldhammer & Abbott

[57] ABSTRACT

An apparatus for automatically adjusting a preselected volume of material dispensed by a volumetric filling machine into containers to be filled by weight. The apparatus has a scale for sequentially weighing a plurality of containers each containing the preselected volume of material dispensed by the filling machine and sequentially generating an equal plurality of weight signals representative of the weight of the dispensed material in the containers. A microprocessor receives and stores the sequential weight signals and stores them in a memory, and calculates an average weight value. The microprocessor then compares the average weight value to a preselected weight value and generates a correction signal representative of the comparison. A controller responsive to the correction signal adjusts the preselected volume by an amount sufficient to cause the average weight value to be equal to the preselected weight value.

22 Claims, 5 Drawing Figures

FEEDBACK CONTROL FOR AUTOMATIC FILLING MACHINE

BACKGROUND OF THE INVENTION

The basic concept of filling containers by dispensing materials from a hopper using a rotary feed mechanism is well known. See, for example, U.S. Pat. Nos. Re. 23,888 and Re 24,079. Apparatus such as that shown in these patents can be used for volumetric filling of free-flowing and non-free-flowing granular, powdered, flaked or paste material. Typically, the feed mechanism is positioned in an opening in the bottom of a vertically-disposed conical hopper and consists of either an auger or a pump. The auger, pump rotor, or other rotational member is driven by a prime mover, such as an electric motor, through a clutch-brake mechanism which connects the driving shaft of the motor to the driven shaft of the rotational member. The clutch-brake mechanism is controlled to rotate the driven shaft for a pre-selected number of revolutions by a device which counts the number of revolutions. This is a relatively accurate way of volumetrically dispensing material since the amount of material dispensed by each revolution of the auger or pump can be accurately determined. For example, for each revolution of an auger of known pitch and diameter, the volume of material dispensed from its discharge end can be determined. By appropriate control, the auger can be made to run through sequential cycles of a predetermined number of turns. During each cycle, therefore, a predetermined volume of material is discharged into a container positioned by mechanized packaging devices beneath the discharge end of the feed mechanism. Mechanized packaging line devices for sequentially positioning containers made of paper, metal, plastic or glass are well known.

Since each revolution of the feed mechanism dispenses a known amount of material, it follows that the number of revolutions is a measure of the volume of material that has been dispensed. There are two methods for determining the number of revolutions. The first method is to directly count the number of revolutions. The second method is to measure the time period over which the feed mechanism is being driven at a constant speed. In known apparatus, devices for counting the number of revolutions include counters directly linked by gearing the output side of the clutch-brake mechanism mentioned above, and shaft encoders directly or indirectly coupled to the driven shaft which generate a given number of pulses for each complete revolution of the driven shaft. When the correct count is reached, the driven shaft is disengaged from the driving shaft and braked by the clutch-brake mechanism.

The timed method of controlling the number of revolutions is less accurate than the count method, although in certain cases the timed method of controlling the number of revolutions may yield acceptable accuracy.

As noted above, known filling machines operate in a volumetric mode. That is, for an auger of known pitch and diameter, each revolution of the auger dispenses a given volume. However, in many instances, the material being filled into the container is ultimately sold to the consumer by weight, not volume. Thus, in order to fill a one-pound coffee can with one pound of coffee, for example, the filling machine must dispense a particular volume of coffee which will have a weight of one pound. Obviously, the weight of the material dispensed is equal to the product of the density of the material times the volume dispensed. Variations in density, due to factors such as temperature, humidity or other factors, will result in different weights of material for a given volume, and these factors can change within a production run.

It is an object of the invention to provide a self-correcting feedback control system for auger fillers which can adjust filler settings to compensate for product density changes and the like, and therefore changes in weight of dispensed material, without interrupting production.

SUMMARY OF THE INVENTION

The present invention provides apparatus for automatically adjusting a preselected volume of material dispensed by a volumetric filling machine into containers to be filled by weight. The apparatus comprises means for sequentially weighing a plurality of containers each of which contains the preselected volume of material dispensed by the filling machine and sequentially generating an equal plurality of weight signals representative of the weight of the dispensed material in the containers. Means are provided for receiving the sequential weight signals and storing them in a memory. Means operatively associated with the receiving means are provided for calculating from the stored weight values an average weight value. Means operatively associated with the calculating means are provided for comparing the average weight value to a preselected weight value and generating a correction signal representative of the comparison. Means responsive to the correction signal are provided for adjusting the preselected volume by an amount sufficient to cause the average weight value to be equal to the preselected weight value.

In one embodiment of the invention, the invention provides apparatus for automatically adjusting the predetermined number of revolutions in an automatic filling machine for volumetrically dispensing a preselected weight of material into containers to be filled by causing a rotary dispensing means to rotate through a predetermined number of revolutions. In this embodiment of the invention, means are provided responsive to the correction signal for adjusting the predetermined number of revolution by an amount sufficient to cause the average weight value to be equal to the preselected weight.

The invention also includes a method of automatically adjusting a preselected volume of material dispensed by a volumetric filling machine into containers to be filled by weight, and comprises the steps of sequentially weighing a plurality of containers each containing the preselected volume of material dispensed by the filling machine, sequentially generating an equal plurality of weight signals representative of the weight of the dispensed material in the container, receiving the sequential weight signals and storing in them in a memory, calculating from the stored sequential weight signals an average weight value, comparing the average weight value to a preselected weight value, generating a correction signal representative of the comparison, and adjusting the preselected volume by an amount sufficient to cause the average weight to be equal to the preselected weight value.

In one method according to the invention, the method includes automatically adjusting a predetermined number of revolutions of a rotary dispensing means in an automatic filling machine for volumetrically dispensing a preselected weight of material into containers to be filled by causing the rotary dispensing means to rotate through a predetermined number of revolutions proportional to the volume of material dispensed. In this method, the predetermined number of revolutions is adjusted by an amount sufficient to cause the average weight value to be equal to the preselected weight.

In both the apparatus and method, the invention is not limited to adjustment of the number of revolutions of a dispensing means but includes automatically adjusting a predetermined time of revolution of a rotary dispensing means, the time of revolution being proportional to the volume of material dispensed. That is, the invention is applicable to automatic filling machines which operate in both revolution-controlled and time-controlled dispensing modes.

DETAILED DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE INVENTION

Figure 1:
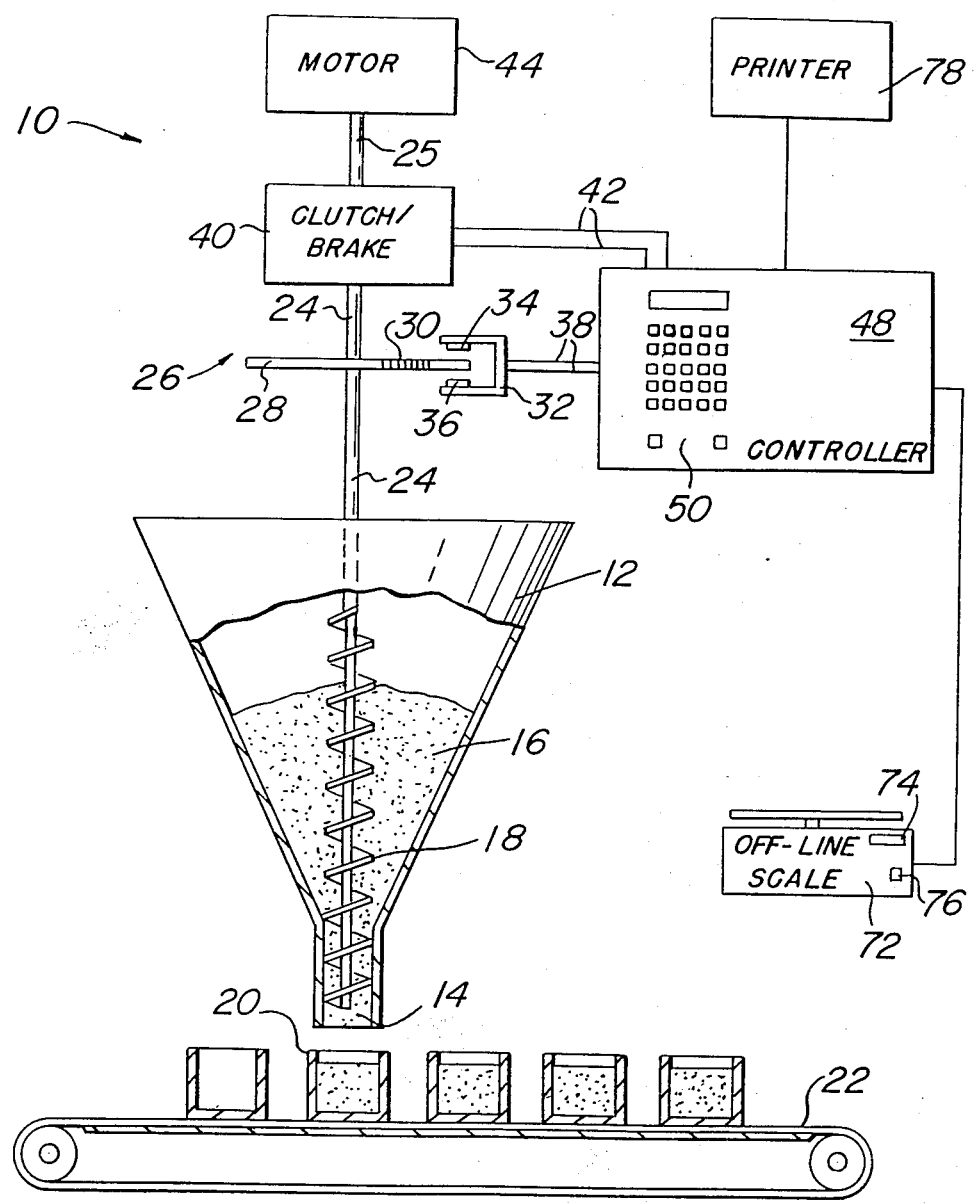
FIG. 1 illustrates in schematic form a filling apparatus equipped with feedback control in accordance with the present invention.

Referring now to the drawings, wherein like numerals indicate like elements, there is shown in FIG. 1 in schematic form a filling apparatus 10 equipped with feedback control in accordance with the present invention. Apparatus 10 has a hopper 12 for storing material to be dispensed. Hopper 12 has generally the shape of an inverted cone. The bottom end of hopper 12 terminates in generally cylindrical outlet 14.

A rotary dispensing means is in the form of a feed auger 18 is fitted within the outlet 14 at the bottom end of hopper 12. Rotation of the auger 18 causes material 16 to be dispensed from hopper 12 through outlet 14 into containers 20 which are positioned manually or by a conveyor 22 beneath hopper 12. Conveyor 22 may be any well-known and widely employed conveyor for indexing individual containers to be filled beneath hopper outlet 14.

It should be understood that by illustrating an auger there is no intention to limit the invention to filling machines which utilize an auger. Auger 18 could just as well be a screw rotor of a Moyno type pump such as that shown in U.S. Pat. No. Re. 24,079. However, for purposes of illustrating the invention, reference will be made to an auger.

Auger 18 may be caused to rotate by means of auger shaft 24. The lower end of shaft 24 may be integral with or otherwise securely fastened to auger 18. The upper end of shaft 24 is connected through clutch-brake 40 to driving motor 44. For purposes of illustrating the invention, clutch-brake 40 and motor 44 are coupled by shaft 25. Clutch-brake 40 and motor 44 may be any conventional motor and clutch brake. Such devices are well-known and widely used in the art and need not be explained here in detail.

A shaft encoder assembly 26 is coupled to auger shaft 24. Shaft encoder assembly 26 may be an electrooptic shaft encoder such as that shown in U.S. Pat. No. 3,743,140. Alternatively, shaft encoder 26 may be any type of shaft encoder which generates signals indicative of the rotation of auger shaft 24. In the particular embodiment illustrated in FIG. 1, shaft encoder 26 consists of a disk 28 which is coupled to shaft 24 so as to rotate with it. The function of disk 28 is to act as a light chopper. For this purpose, it is provided with a plurality of slots, lines or holes 30 which are evenly spaced about its periphery. The number of slots, lines or holes 30 can be varied. However, for convenience the disk 28 may have 100 slots, thereby providing a number which is easily divisible to indicate a complete revolution of shaft 24 and hence auger 18. A bracket 32 supports a light source 34. Light source 34 may be the filament of an incandescent lamp or a light emitting diode which generates a constant light output. Bracket 32 also supports a photodetector 36, such as a phototransistor or the like, which is sensitive to the light energy generated by the light source 34.

The light source 34 and the photo detector 36 are positioned by the bracket 32 in opposing relation adjacent the peripheral edge of the disk 28. Thus, light energy emitted by the light source 34 must pass through the slots 30 in the disk 28 in order to be detected by the photodetector 36. As a result, the output of the photodetector 36 will be a series of discrete electrical pulses whose frequency will depend upon the speed at which the shaft 24 is rotating. Likewise, the number of pulses generated in a given interval will indicate the extent to which shaft 24, and hence auger 18, has revolved in that interval.

The pulses generated by shaft encoder assembly 26 are fed to a controller 48 via wires 38. Similarly, clutch-brake 40 is connected to controller 48 by wires 42. Controller 48, which will be described in greater detail below, receives the pulses generated by shaft encoder assembly 26, processes them and generates control signals which control the operation of clutch-brake 40. Controller 48 is provided with a control/display panel 50 which may display machine status and other information to an operator, and by means of which an operator may provide various inputs to controller 48.

Controller 48 also receives inputs from an off-line scale 72, located off conveyor 22 out of the normal flow of filled containers 20. Scale 72 may be an electronic scale or strain gauge, which generates an output weight signal representative of the weight of an item placed on scale 72. Scale 72 has a display 74 and an "initiate" control 76, discussed in greater detail below.

A printer 78 may be connected to controller 48 to provide a "hard copy" of data displayed on control/display panel 50, or of any other data desired, with suitable programming of controller 48.

Figure 2:
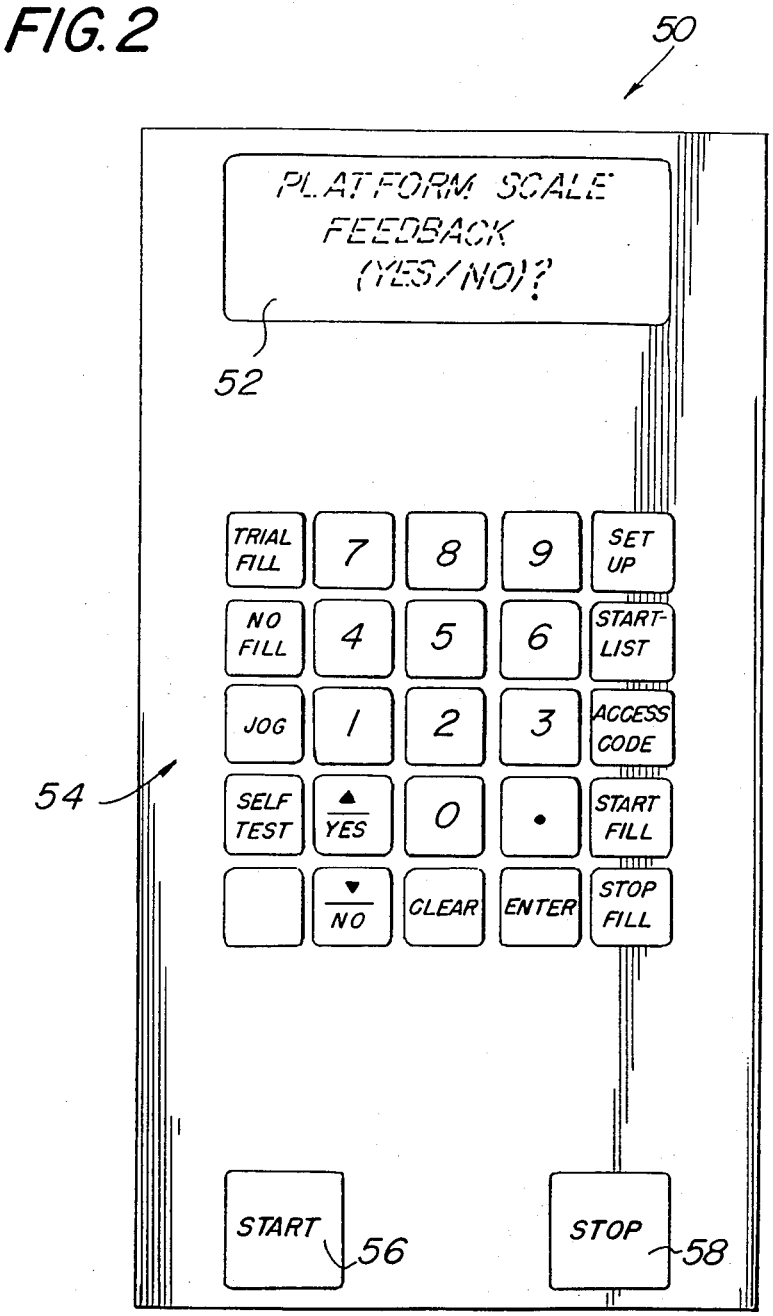
FIG. 2 illustrates a typical operator control panel of an apparatus in accordance with the present invention.

Control/display panel 50 is shown in greater detail in FIG. 2. Control/display panel 50 has a display section 52, which may be an LED display or liquid crystal display, or any other display suitable for displaying alphanumeric information to an operator. Display 52 may serve to display machine status, verify inputs entered by an operator, or display instructions to an operator to "prompt", or assist, the operator in providing necessary inputs or aid the operator in trouble shooting.

Adjacent display section 52 is an operator-actuated keyboard or push button assembly 54. This may be used by an operator to enter commands to the machine, enter data requested by the controller 48, and otherwise permit the operator to communicate with controller 48. Control panel 50 may also include start and stop buttons 56 and 58 for initiating and terminating machine operation.

Figure 3:
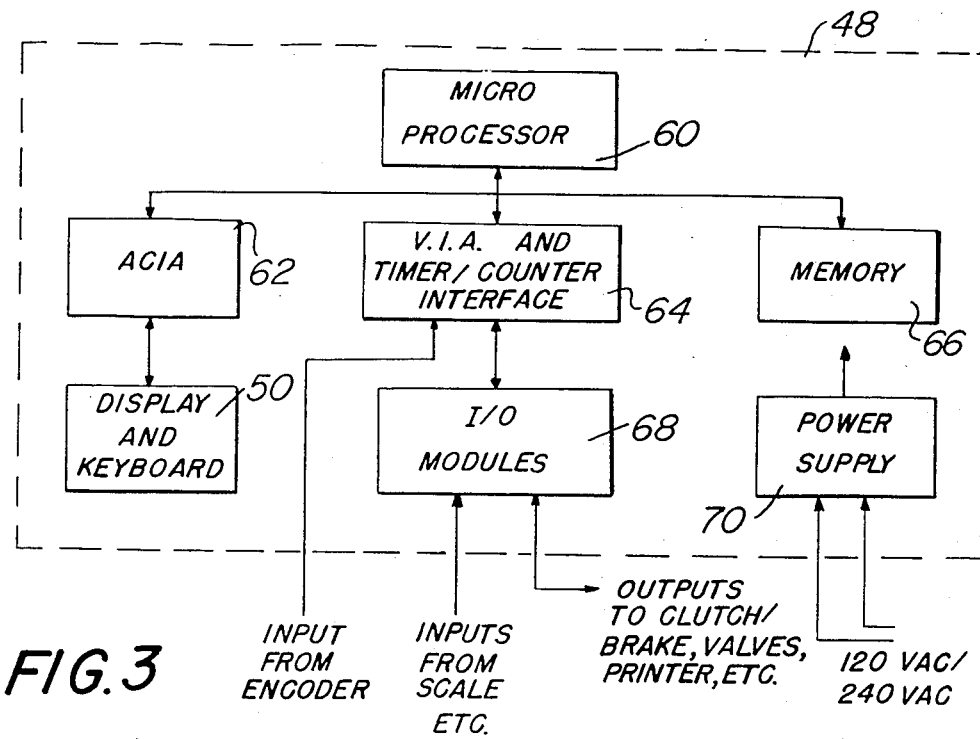
FIG. 3 is a block diagram of one embodiment of a control means for the present invention.

Controller 48 is illustrated in greater detail in block diagram form in FIG. 3. The heart of controller 48 is a microprocessor 60, which can be programmed to monitor and direct any number of machine functions. The operation of microprocessor 60 is synchronized with the remainder of the machine by input from shaft encoder 26 via versatile interface adapter (V.I.A.) and timer/counter interface 64. Operator inputs may be entered into microprocessor 60 via asynchronous control interface assembly (A.C.I.A.) 62, which translates operator-entered inputs from keyboard assembly 52 into a form usable by microprocessor 60. Likewise, A.C.I.A. 62 converts prompt and other messages generated by microprocessor 60 into operator-readable form for display by display section 52. The microprocessor 60 also receives inputs from other portions of the apparatus 10, such as the pulses generated by shaft encoder assembly 26, and generates control outputs to clutch-brake 40. Encoder pulses go directly into the V.I.A. 64. Other inputs and outputs are coupled to microprocessor 60 by means of I/O module 68. Controller 48 also includes a memory 66 which may be used to store data, commands and other information required by the microprocessor 60 or the operator to carry out various machine functions. Power supply 70 may be any conventional power supply and converts input power in the form of 120 V ac or 240 V ac into a dc voltage suitable for the controller electronics.

Although it is not necessary for understanding of the present invention, for a more detailed description of the operation of filler 10 and controller 48, reference may be made to U.S. Pat. No. 4,582,097, assigned to the assignee of the present application.

The function of the feedback control of the present invention is to adjust the number of auger revolutions (or the time of auger revolution; for simplicity, the following discussion is directed only to adjustment of number of auger revolutions) preselected by an operator by means of controller 48 to compensate for weight fluctuations in filled containers. With the present invention, the controller 48 will receive a preselected number of filled container weight values from scale 72, calculate the average of these values, then compare the averaged weight to the target weight value residing in memory 66 of the controller 48. If this comparison indicates a difference between the average weight value and the target weight value, microprocessor 60 will automatically adjust the preselected number of auger revolutions to correct for the entire difference.

Operation of the feedback control will now be described.

At the beginning of a filling operation, the operator enters the target weight of material to be filled into containers 20 into memory 66 of controller 48 along with information about the number of packages desired in a batch for averaging weights. The operator will also have entered information which enables controller 48 to calculate the number of auger revolutions necessary to dispense the target weight, as described in U.S. Pat. 4,582,097. All entries are made through push button assembly 54. Once the filling operation has begun, at regular or random intervals the operator removes containers 20 from conveyor 22 to be weighed by scale 72. Display 74 on scale 72 displays the weight of a selected container 20. As long as the weight displayed by scale 72 is within acceptable limits, the filling operation can proceed as originally programmed. However, if scale 72 indicates that the weights of selected containers 20 are outside an acceptable range, the operator begins the feedback control operation.

In the feedback control operation, the operator weighs a predetermined batch number of packages in order to arrive at an average weight value. As each package is weighed by scale 72, the weight signal generated by scale 72 is sent to controller 48 when the "initiate" control 76 is depressed by the operator. As each weight signal is received by controller 48, it is displayed on display section 52 of controller 48. Microprocessor 60 then analyzes the weight data and calculates a correction factor. This correction factor is used to alter the number of auger revolutions required to dispense the target weight.

Figure 4:
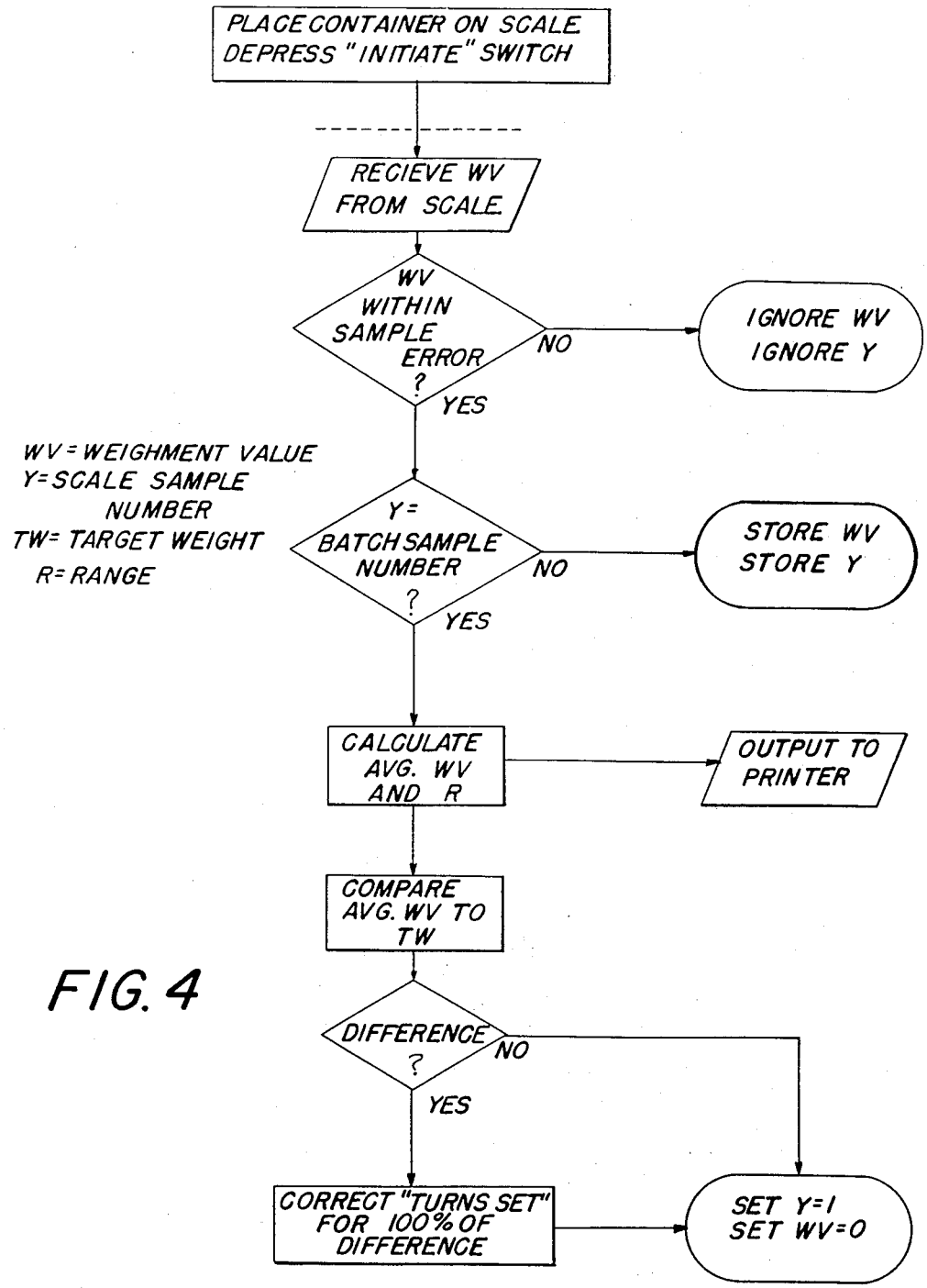
FIG. 4 is a flow chart illustrating the operation of the feedback control according to the present invention.

Operation of the feedback control system is graphically depicted in the flow chart of FIG. 4. In FIG. 4, the appreviation "WV" represents the "weighment value" or weight signal generated by scale 72; "Y" represents the number of samples to be weighed in a batch; "TW" represents target weight; and "R" represents the "range" or difference between the maximum and minimum weighment values in a batch.

When a batch of containers 20 are to be weighed, the operator places the container on scale 72 and depresses the "initiate" switch 76. This causes the scale 72 to send the weighment value to controller 48. When controller 48 receives the weighment value from scale 72, it determines whether or not the weighment value is within a sample error tolerance preselected by the operator. If the weighment value is not within the preselected sample error, the weighment value and sample number are ignored. If the weighment value is within the sample error, controller 48 then determines whether or not the number of weighment values received from scale 72 is equal to the number of samples to be weighed in the batch. The sample number is incremented by one each time a weighment value within the sample error is received from scale 72. If the scale sample number is less than the batch sample number, the weighment value and sample number are stored. Weighment values are stored until the scale sample number is equal to the batch sample number. When that occurs, indicating that all of the containers in the batch have been weighed, controller 48 calculates an average weighment value and the range between the maximum and minimum weighment values in the batch. If desired, this average weighment value and range may be output to printer 78.

Controller 48 also compares the average weighment value to the target weight entered into memory 60 by the operator. If there is a difference between the average weighment value and target weight, the number of auger revolutions, or "turns", is adjusted to account for 100% of the difference between the average weighment value and target weight. That is, the number of auger revolutions is either increased or decreased so that the weight of material dispensed by the ajusted number of auger revolutions will be equal to the target weight. If there is no difference between the average weighment value and the target weight, indicating that is no need to adjust the number auger revolutions, the scale sample number is reset to one and the stored weighment values are reset to zero.

Figure 5:
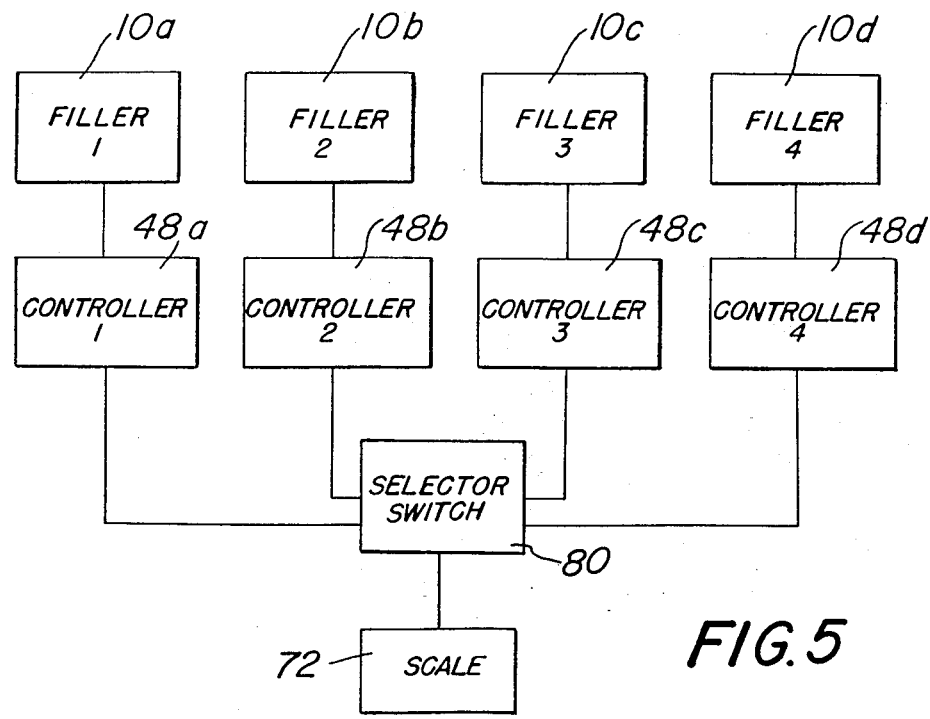
FIG. 5 is a much-simplified block diagram showing how the present invention can be applied to a number of individual filler lines operating in parallel.

The present invention may operate with several fillers at one time. As shown in FIG. 5, four fillers 10a–10d may receive inputs via their respective controllers 48a–48d by means of a selector switch 80. To control a given one of the fillers 10a–10d, all the operator need do is select the appropriate filler at selector switch 80 prior to beginning the feedback control operation.

The present invention may be embodied in other specific forms without departing from the spirit or essential attributes thereof and, accordingly, reference should be made to the appended claims, rather than to the foregoing specification, as indicating the scope of the invention.

I claim:

1. Apparatus for automatically adjusting a preselected volume of material dispensed by a volumetric filling machine into containers to be filled by weight, comprising
    (a) means for sequentially weighing a plurality of containers each containing the preselected volume of material dispensed by the volumetric filling machine and sequentially generating an equal plurality of weight signals representative of the weight of the dispense material in the containers,
    (b) means for receiving the sequential weight signals and storing them in a memory,
    (c) means operatively associated with the receiving means for calculating from the stored sequential weight signals an average weight value,
    (d) means operatively associated with the calculating means for comparing the average weight value to a preselected weight value and generating a correction signal representative of the comparison, and
    (e) means responsive to the correction signal for adjusting the preselected volume by an amount sufficient to cause the average weight value to be equal to the preselected weight value.

2. Apparatus for automatically adjusting a preselected volume of material dispensed by a volumetric filling machine into containers to be filled by weight, comprising
    (a) means for sequentially weighing a plurality of containers each containing the preselected volume of material dispensed by the volumetric filling machine and sequentially generating an equal plurality of weight signals representative of the weight of the dispense material in the containers,
    (b) means for receiving the sequential weight signals and determining whether the weight signals are within preselected tolerance limits,
    (c) means for rejecting weight signals outside the preselected tolerance limits and storing signals within the preselected tolerance limits,
    (d) means operatively associated with the receiving means for calculating from the stored sequential weight signals an average weight value and a range value equal to the difference between the maximum stored sequential weight signal and minimum stored sequential weight signal,
    (e) means for printing each stored sequential weight value, the average weight value and the range value,
    (f) means operatively associated with the calculating means for comparing the average weight value to a preselected weight value and generating a correction signal representative of the comparison, and
    (g) means responsive to the correction signal for adjusting the preselected volume by an amount sufficient to cause the average weight value to be equal to the preselected weight value.

3. In an automatic filling machine for volumetrically dispensing a preselected weight of material into containers to be filled by causing a rotary dispensing means to rotate through a predetermined number of revolutions, the number of revolutions being proportional to the volume of material dispensed, apparatus for automatically adjusting the predetermined number of revolutions, comprising:
    (a) means for sequentially weighing a plurality of containers each containing the amount of material dispensed by the predetermined number of revolutions of the dispensing means and sequentially generating an equal plurality of weight signals representative of the weight of the dispensed material in the containers,
    (b) means for receiving the sequential weight signals and storing them in a memory,
    (c) means operatively associated with the receiving means for calculating from the stored sequential weight signals an average weight value,
    (d) means operatively associated with the calculating means for comparing the average weight value to a preselected weight value and generating a correction signal representative of the comparison, and
    (e) means responsive to the correction signal for adjusting the predetermined number of revolutions by an amount sufficient to cause the average weight value to be equal to the preselected weight.

4. In an automatic filling machine according to claim 3, wherein the sequential weighing means comprises an electronic scale.

5. In an automatic filling machine according to claim 3, wherein the calculating means and the comparison means comprise a microprocessor.

6. In an automatic filling machine for volumetrically dispensing a preselected weight of material into containers to be filled by causing a rotary dispensing means to rotate through a predetermined number of revolutions, the number of revolutions being proportional to the volume of material dispensed, apparatus for automatically adjusting the predetermined number of revolutions, comprising:
    (a) an electronic scale for sequentially weighing a plurality of containers each containing the amount of material dispensed by the predetermined number of revolutions of the dispensing means and sequentially generating an equal plurality of weight signals representative of the weight of the dispensed material in the containers,
    (b) means for receiving the sequential weight signals and determining whether the weight signals are within preselected tolerance limits,
    (c) means for rejecting weight scales outside the preselected tolerance limits and storing signals within the preselected tolerance limits,
    (d) means operatively associated with the receiving means for calculating from the stored sequential weight signals an average weight value and a range value equal to the differnce between the maximum stored sequential weight signal and minimum stored sequential weight signal, (e) means for printing each stored sequential weight value, the average weight value and the range value, (f) means operatively associated with the calculating means for comparing the average weight value to a preselected weight value and generating a correction signal representative of the comparison, and (g) means responsive to the correction signal for adjusting the predetermined number of revolutions by an amount sufficient to cause the average weight value to be equal to the preselected weight.

7. In an automatic filling machine according to claim 6, wherein the calculating means and the comparison means comprise a microprocessor.

8. In an automatic filling machine for volumetrically dispensing a preselected weight of material into containers to be filled by causing a rotary dispensing means to rotate for a predetermined time, the time being proportional to the volume of material dispensed, apparatus for automatically adjusting the time of revolution, comprising:

(a) means for sequentially weighing a plurality of containers each containing the amount of material dispensed by the predetermined time of revolution of the dispensing means and sequentially generating an equal plurality of weight signals representative of the weight of the dispensed material in the containers, (b) means for receiving the sequential weight signals and storing them in a memory, (c) means operatively associated with the receiving means for calculating from the stored sequential weight signals an average weight value, (d) means operatively associated with the calculating means for comparing the average weight value to a preselected weight value and generating a correction signal representative of the comparison, and (e) means responsive to the correction signal for adjusting the predetermined time of revolution by an amount sufficient to cause the average weight value to be equal to the preselected weight.

9. In an automatic filling machine according to claim 8, wherein the sequential weighing means comprises an electronic scale.

10. In an automatic filling machine according to claim 8, wherein the calculating means and the comparison means comprise a microprocessor.

11. In an automatic filling machine for volumetrically dispensing a preselected weight of material into containers to be filled by causing a rotary dispensing means to rotate for a predetermined time, the time being proportional to the volume of material dispensed, apparatus for automatically adjusting the time of revolution, comprising:

(a) an electronic scale for sequentially weighing a plurality of containers each containing the amount of material dispensed by the predetermined time of revolution of the dispensing means and sequentially generating an equal plurality of weight signals representative of the weight of the dispensed material in the containers, (b) means for receiving the sequential weight signals and determining whether the weight signals are within preselected tolerance limits, (c) means for rejecting weight scales outside the preselected tolerance limits and storing signals within the preselected tolerance limits, (d) means operatively associated with the receiving means for calculating from the stored sequential weight signals an average weight value and a range value equal to the difference between the maximum stored sequential weight signal and minimum stored sequential weight signal, (e) means for printing each stored sequential weight value, the average weight value and the range value, (f) means operatively associated with the calculating means for comparing the average weight value to a preselected weight value and generating a correction signal representative of the comparison, and (g) means responsive to the correction signal for adjusting the predetermined time of revolution by an amount sufficient to cause the average weight value to be equal to the preselected weight.

12. In an automatic filling machine according to claim 11, wherein the calculating means and the comparison means comprise a microprocessor.

13. Method of automatically adjusting a preselected volume of material dispensed by a volumetric filling machine into containers to be filled by weight, comprising the steps of (a) sequentially weighing a plurality of containers each containing the preselected volume of material dispensed by the volumetric filling machine, (b) sequentially generating an equal plurality of weight signals representative of the weight of the dispensed material in the containers, (c) receiving the sequential weight signals and storing them in a memory, (d) calculating from the stored sequential weight signals an average weight value, (e) comparing the average weight value to a preselected weight value, (f) generating a correction signal representative of the comparison, and (g) adjusting the preselected volume by an amount sufficient to cause the average weight to be equal to the preselected weight value.

14. Method of automatically adjusting a preselected volume of material dispensed by a volumetric filling machine into containers to be filled by weight, comprising the steps of (a) sequentially weighing a plurality of containers each containing the preselected volume of material dispensed by the volumetric filling machine, generating an equal plurality (b) sequentially generating an equal plurality of weight signals representative of the weight of the dispensed material in the containers, (c) receiving the sequential weight signals and determining whether the weight signals are within preselected tolerance limits, (d) rejecting weight signals outside the preselected tolerance limits and storing signals within the preselected tolerance limits in a memory, (e) calculating from the stored sequential weight signals an average weight value and range value equal to the difference between the maximum stored sequential weight signal and minimum sequential weight signal, (f) comparing the average weight value to a preselected weight value, (g) generating a correction signal representative of the comparison, and (h) adjusting the preselected volume by an amount sufficient to cause the average weight to be equal to the preselected weight value.

15. Method according to claim 14, further comprising the step of printing the store sequential weight values, the average weight value and the range value.

16. Method of automatically adjusting a predetermined number of revolutions of a rotary dispensing means in an automatic filling machine for volumetrically dispensing a preselected weight of material into containers to be filled by causing the rotary dispensing means to rotate through a predetermined number of revolutions proportional to the volume of material dispensed, comprising the steps of (a) sequentially weighing a plurality of containers each containing the amount of material dispensed by the predetermined number of revolutions of the dispensing means, (b) sequentially generating an equal plurality of weight signals representative of the weight of the dispensed material in the containers, (c) means for receiving the sequential weight signals and storing them in a memory, (d) means operatively associated with the receiving means for calculating from the stored sequential weight signals an average weight value, (e) means operatively associated with the calculating means for comparing the average weight value to a preselected weight value, (f) generating a correction signal representative of the comparison, and (g) adjusting the predetermined number of revolutions by an amount sufficient to cause the average weight value to be equal to the preselected weight.

17. Method of automatically adjusting a predetermined number of revolutions of a rotary dispensing means in an automatic filling machine for volumetrically dispensing a preselected weight of material into containers to be filled by causing the rotary dispensing means to rotate through a predetermined number of revolutions proportional to the volume of material dispensed, comprising the steps of (a) sequentially weighing a plurality of containers each containing the amount of material dispensed by the predetermined number of revolutions of the dispensing means, (b) sequentially generating an equal plurality of weight signals representative of the weight of the dispensed material in the containers, (c) means for receiving the sequential weight signals and determining whether the weight signals are within preselected tolerance limits, (d) rejecting weight signals outside the preselected tolerance limits and storing signals within the preselected tolerance limits in a memory, (e) means operatively associated with the receiving means for calculating from the stored sequential weight signals an average weight value and a range value equal to the difference between the maximum stored sequential weight signal and minimum sequential weight signal, (f) means operatively associated with the calculating means for comparing the average weight value to a preselected weight value, (g) generating a correction signal representative of the comparison, and (h) adjusting the predetermined number of revolutions by an amount sufficient to cause the average weight value to be equal to the preselected weight.

18. Method according to claim 17, further comprising the step of printing the stored sequential weight values, the average weight value and the range value.

19. Method of automatically adjusting a predetermined number of revolutions of a rotary dispensing means in an automatic filling machine for volumetrically dispensing a preselected weight of material into containers to be filled by causing the rotary dispensing means to rotate for a predetermined time proportional to the volume of material dispensed, comprising the steps of (a) sequentially weighing a plurality of containers each containing the amount of material dispensed by the predetermined time of revolution of the dispensing means, (b) sequentially generating an equal plurality of weight signals representative of the weight of the dispensed material in the containers, (c) means for receiving the sequential weight signals and storing them in a memory, (d) means operatively associated with the receiving means for calculating from the stored sequential weight signals an average weight value, (e) means operatively associated with the calculating means for comparing the average weight value to a preselected weight value, (f) generating a correction signal representative of the comparison, and (g) adjusting the predetermined time of revolution by an amount sufficient to cause the average weight value to be equal to the preselected weight.

20. Method of automatically adjusting a predetermined number of revolutions of a rotary dispensing means in an automatic filling machine for volumetrically dispensing a preselected weight of material into containers to be filled by causing the rotary dispensing means to rotate for a predetermined time proportional to the volume of material dispensed, comprising the steps of (a) sequentially weighing a plurality of containers each containing the amount of material dispensed by the predetermined time of revolution of the dispensing means, (b) sequentially generating an equal plurality of weight signals representative of the weight of the dispensed material in the containers, (c) means for receiving the sequential weight signals and determining whether the weight signals are within preselected tolerance limits, (d) rejecting weight signals outside the preselected tolerance limits and storing signals within the preselected tolerance limits in a memory, (e) means operatively associated with the receiving means for calculating from the stored sequential weight signals an average weight value and a range value equal to the difference between the maximum stored sequential weight signal and minimum sequential weight signal, (f) means operatively associated with the calculating means for comparing the average weight value to a preselected weight value, (g) generating a correction signal representative of the comparison, and (h) adjusting the predetermined time of revolution by an amount sufficient to cause the average weight value to be equal to the preselected weight.

21. Method according to claim 20, further comprising the step of printing the stored sequential weight values, the average weight value and the range value.

22. Apparatus for automatically adjusting a preselected volume of material dispensed by a each of a plurality of individual volumetric filling machines into containers to be filled by weight, comprising
 (a) a single means for sequentially weighing a plurality of containers from one of the individual filling machines, each container containing the preselected volume of material dispensed by the individual volumetric filling machine associated with that plurality of containers and sequentially generating an equal plurality of weight signals representative of the weight of the dispense material in the containers,
 (b) switch means for directing the plurality of weight signals to a selected one of the individual filling machines,
 (c) means at each filling machine for receiving the sequential weight signals and storing them in a memory,
 (d) means at each filling machine operatively associated with the receiving means for calculating from the stored sequential weight signals an average weight value,
 (e) means at each filling machine operatively associated with the calculating means for comparing the average weight value to a preselected weight value and generating a correction signal representative of the comparison, and
 (f) means at each filling machine responsive to the correction signal for adjusting the preselected volume by an amount sufficient to cause the average weight value to be equal to the preselected weight value.

* * * * *